(12) United States Patent
Nakamura et al.

(10) Patent No.: US 9,891,748 B2
(45) Date of Patent: Feb. 13, 2018

(54) DISPLAY DEVICE AND DISPLAY DEVICE PROVIDED WITH SENSOR

(71) Applicant: Japan Display Inc., Minato-ku (JP)

(72) Inventors: Takashi Nakamura, Tokyo (JP); Masahiro Tada, Tokyo (JP); Takanori Tsunashima, Tokyo (JP); Hirotaka Hayashi, Tokyo (JP); Kazuhide Mochizuki, Tokyo (JP)

(73) Assignee: Japan Display Inc., Minato-ku (JP)

( * ) Notice: Subject to any disclaimer, the term of this patent is extended or adjusted under 35 U.S.C. 154(b) by 75 days.

(21) Appl. No.: 15/059,450

(22) Filed: Mar. 3, 2016

(65) Prior Publication Data

US 2016/0259475 A1   Sep. 8, 2016

(30) Foreign Application Priority Data

Mar. 6, 2015 (JP) ................. 2015-044789

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
None
See application file for complete search history.

(56) References Cited

U.S. PATENT DOCUMENTS

2002/0093473 A1   7/2002   Tanaka et al.

FOREIGN PATENT DOCUMENTS

JP   2002-278523   9/2002

*Primary Examiner* — Duane N Taylor, Jr.
(74) *Attorney, Agent, or Firm* — Oblon, McClelland, Maier & Neustadt, L.L.P.

(57) ABSTRACT

According to one embodiment, a display device includes plural display pixels arranged in a matrix, plural gate lines, plural source lines and a control circuit which controls by applying intermittent driving and a column-inversion drive scheme, an operation in which drive signals are supplied to the gate lines and the source lines, and an image signal is supplied to the display pixels and held thereby, wherein the display pixels each include a liquid crystal in which alignment of liquid crystal molecules is changed by a voltage between pixel electrodes and a common electrode, and the control circuit applies in a signal stop period in the intermittent driving, a voltage corresponding to a gradation higher than or equal to white gradation to the source lines in a case where a display mode of the liquid crystal is a normally-black mode.

9 Claims, 12 Drawing Sheets

DISPLAY DEVICE AND DISPLAY DEVICE PROVIDED WITH SENSOR

CROSS-REFERENCE TO RELATED APPLICATIONS

This application is based upon and claims the benefit of priority from Japanese Patent Application No. 2015-044789, filed Mar. 6, 2015, the entire contents of which are incorporated herein by reference.

FIELD

Embodiments described herein relate generally to a display device and a display device provided with a sensor.

BACKGROUND

Liquid crystal display devices are mounted on various apparatuses and devices such as a television receiver, an in-vehicle display, for example, car navigation equipment, a notebook computer, a tablet computer, mobile terminals, for example, a cell phone and a smartphone.

Such liquid crystal display devices employ liquid crystals whose modes vary in accordance with intended purposes.

For example, in a liquid crystal display device which is of a vertical-electric-field type such as a twisted nematic (TN) mode or an optically compensated (OCB) mode, the alignment direction of liquid crystal molecules contained in a liquid crystal layer held between a counter-electrode provided in an upper substrate and pixel electrodes provided in an lower substrate is controlled by an electric field generated between the counter-electrode and the pixel electrodes.

In a liquid crystal display device which is of a lateral-electric-field type such as an in-plane switching (IPS) mode or a fringe-field switching (FFS) mode, a counter-electrode (which is referred to as a common electrode in this type of liquid crystal device) and pixel electrodes are provided in a single substrate only, and the alignment direction of liquid crystal molecules contained in a liquid crystal layer is controlled by an electric field (fringe electric field) generated between the common electrode and the pixel electrodes. The FFS mode of liquid crystal display device can ensure a great aperture ratio, and thus has a high brightness and a superior viewing angle characteristic.

A liquid crystal display device for a mobile terminal is strongly required to reduce its circuit power consumption. As means for reducing the circuit power consumption, intermittent driving has been proposed. The intermittent driving is a method for reducing the circuit power consumption by providing a circuit stop period corresponding to a few display periods after writing is performed in a single display period. This method is not suitable for displaying of moving images, since the intervals at which an image signal is subjected to rewriting by a liquid-crystal display unit are long. However, in the case of displaying a still image, etc, i.e., in a display operation in which importance is not attached to visibility of moving images, the above method is considered as an advantageous countermeasure for reducing the circuit power consumption.

However, in the case where intermittent driving is performed in a liquid crystal display device, it is necessary to reduce flicker.

A time period in which an image signal of pixels is subjected to rewriting is referred to as a "frame period" or "single frame"; and the reciprocal thereof is also referred to as a "frame frequency". It is assumed that those names can be applied with respect to the intermittent driving. In the case where the frame frequency was 60 Hz, which is adopted in an ordinary liquid crystal display device, flicker was not particularly noticeable. However, in the intermittent driving, in the case where the frame frequency was reduced, flicker was visually recognized. Also, in the case where the frame frequency was further reduced, flicker was particularly noticeable.

BRIEF DESCRIPTION OF THE DRAWINGS

A general architecture that implements the various feature of the invention will now be described with reference to the drawings. The drawings and the associated descriptions are provided to illustrate embodiments of the invention and not to limit the scope of the invention.

configuration of a display device according to a first embodiment.

DETAILED DESCRIPTION

Various embodiments will be described hereinafter with reference to the accompanying drawings.

In general, according to one embodiment, a display device includes plural display pixels arranged in a matrix, plural gate lines extending along rows in which the display pixels are arranged, plural source lines extending along columns in which the display pixels are arranged and a control circuit which controls by applying intermittent driving and a column-inversion drive scheme, an operation in which drive signals are supplied to the gate lines and the source lines, and an image signal is supplied to the display pixels and held thereby, wherein the display pixels each include a liquid crystal in which alignment of liquid crystal molecules is changed by a voltage between pixel electrodes and a common electrode, and the control circuit applies in a signal stop period in the intermittent driving, a voltage corresponding to a gradation higher than or equal to white gradation to the source lines in a case where a display mode of the liquid crystal is a normally-black mode.

Embodiments will be explained with reference to the accompanying drawings.

The disclosure is a mere example, and arbitrary change of gist which can be easily conceived by a person of ordinary skill in the art naturally falls within the inventive scope. To better clarify the explanations, the drawings may pictorially show width, thickness, shape, etc. of each portion as compared with an actual aspect, but they are mere examples and do not restrict the interpretation of the invention. In the present specification and drawings, after structural elements are each explained once with reference to the drawings, there is a case where their explanations will be omitted as appropriate, and those identical to or similar to the explained structural elements will be denoted by the same reference numbers, respectively, as the explained structural elements.

First Embodiment

Figure 1:
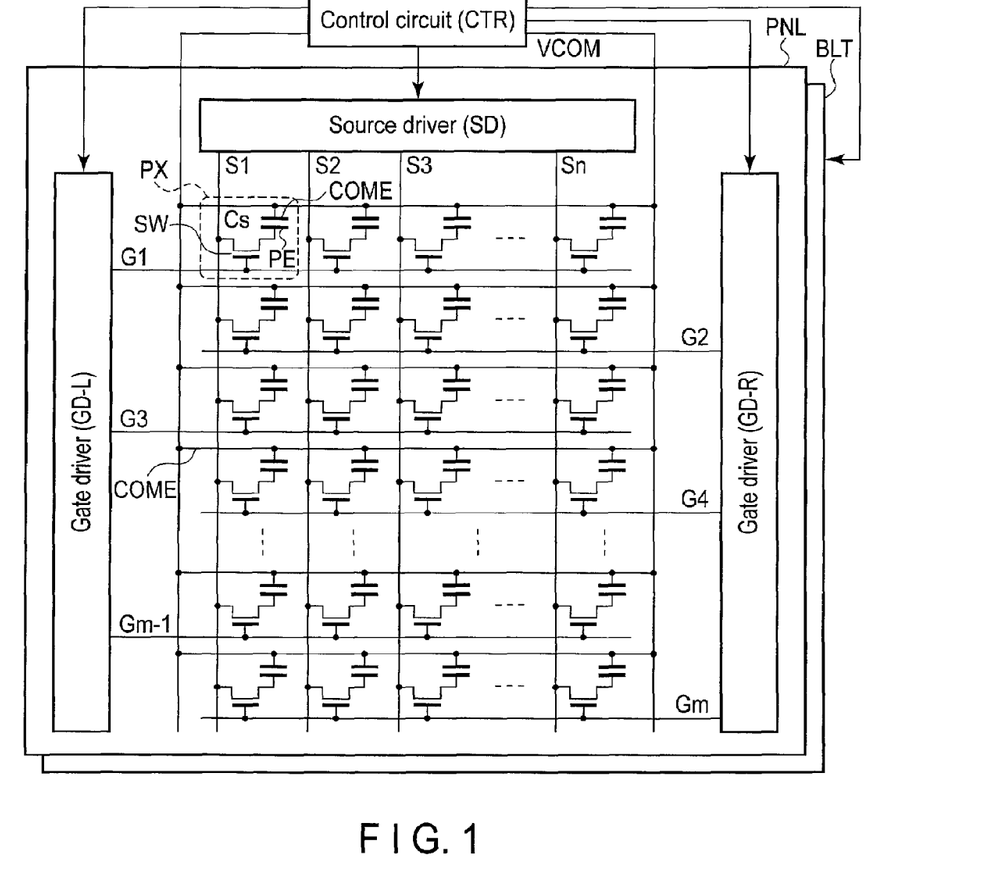

FIG. 1 is a view schematically showing a configuration of a display device DSP according to the first embodiment. In the first embodiment, the display device is a liquid crystal display device.

The display device comprises a display panel PNL and a backlight BLT which illuminates the display panel PNL from a rear surface side thereof. The display panel PNL is provided with a display portion including display pixels PX arranged in a matrix.

As shown in FIG. 1, in the display portion, gate lines G (G1, G2, . . . ) are provided to extend along rows of the display pixels PX; source lines S (S1, S2, . . . ) are provided to extend along columns of the display pixels PX; and pixel switches SW are provided close to intersections of the gate lines G and the source lines S.

Each of the pixel switches SW includes a thin-film transistor (TFT). A gate electrode of each pixel switch SW is electrically connected to an associated one of the gate lines G. A source electrode of each pixel switch SW is electrically connected to an associated one of the source lines S. A drain electrode of each pixel switch SW is electrically connected to an associated one of pixel electrodes PE.

Furthermore, as driving means for driving the display pixels PX, gate drivers GD (left gate driver GD-L and right gate driver GD-R) and a source driver SD are provided. The gate lines G are electrically connected to output terminals of the gate drivers GD. The source lines S are electrically connected to output terminals of the source driver SD.

The gate drivers GD and the source driver SD are located in an area (frame) surrounding the display portion. The gate drivers GD apply on-voltages to the gate lines G successively. When a gate line G is selected, to a gate electrode of a pixel switch SW electrically connected to the selected gate line G, an associated one of the gate drivers SD applies an on-voltage. A source electrode and a drain electrode of the above pixel switch SW whose gate electrode is given the on-voltage are electrically connected to each other. The source driver SD supplies the source lines S with output signals associated with the source lines S, respectively. Through the pixel switch SW whose source and drain electrodes are electrically connected together, an associated pixel electrode PE is supplied with the signal supplied to an associated source line S.

Operations of the gate drivers GD and the source driver SD are controlled by a control circuit CTR provided outside the display panel PNL. Furthermore, the control circuit CTR applies a common voltage Vcom to a common electrode COME to be described later. Also, the control circuit CTR controls an operation of the backlight BLT.

Figure 2:
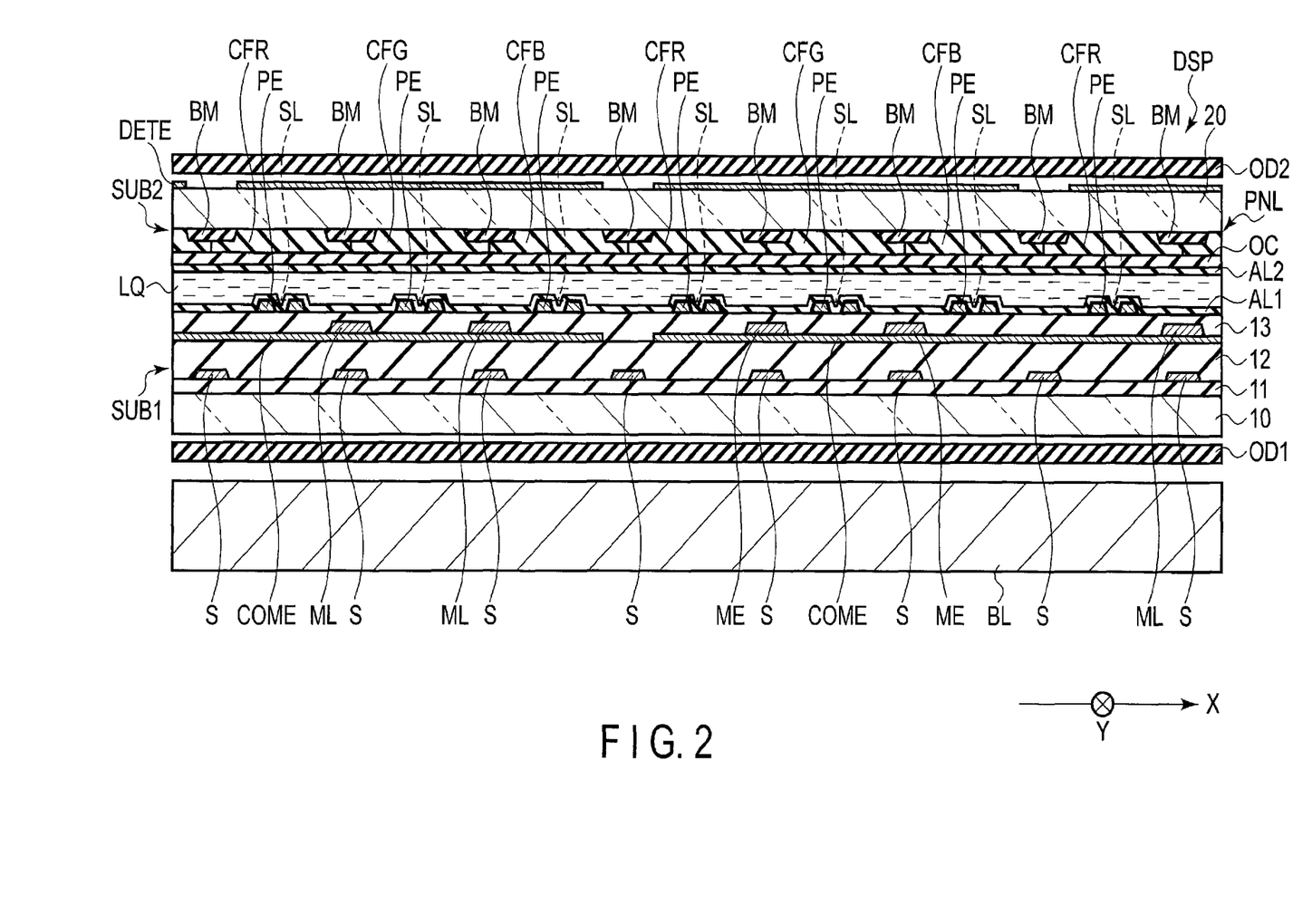
FIG. 2 is a cross-sectional view showing in further detail the configuration of the display device according to the first embodiment.

FIG. 2 is a cross-sectional view which shows in further detail the configuration of the display device DSP according to the first embodiment.

The display device DSP comprises the display panel PNL, the backlight BL, a first optical element OD1 and a second optical element OD2. In the example shown in FIG. 2, the display panel PNL is a liquid crystal display panel; however, it may be another type of flat panel such as an organic electroluminescent display panel. Also, although the display panel PNL as shown in FIG. 2 has a structure adapted for a lateral-electric-field mode applied as a display mode, it may have a structure adapted for another display mode.

The display panel PNL comprises a first substrate SUB1, a second substrate SUB2 and a liquid crystal layer LQ. The first substrate SUB1 and the second substrate SUB2 are attached to each other, with a predetermined cell gap provided between them. The liquid crystal layer LQ is held in the cell gap between the first substrate SUB1 and the second substrate SUB2.

The first substrate SUB1 is formed using a first insulating substrate 10 having a light transmissive property, such as a glass substrate or a resin substrate. The first substrate SUB1 comprises, on a side of the first insulating substrate 10 which faces the second substrate SUB2, the source lines S, the common electrode COME, the pixel electrodes PE, a first insulating film 11, a second insulating film 13, a first alignment film AL1, etc.

It should be noted that the pixel electrodes PE and the common electrode COME form, along with pixel areas of the liquid crystal layer, which are located between those electrodes, display pixels PX which are arranged in a matrix in the display panel PNL.

The first insulating film 11 is provided on the first insulating substrate 10. Although it is not described in detail, the gate lines G, gate electrodes and semiconductor layers of switching elements SW, etc., are provided between the first insulating substrate 10 and the first insulating film 11. The source lines S are formed on the first insulating film 11. Also, source electrodes, drain electrodes, etc., of the switching elements SW are formed on the first insulating film 11. In the example shown in FIG. 2, the source lines S extend in a second direction Y intersecting the common electrode COME.

The second insulating film 12 is provided on the source lines S and the first insulating film 11. The common electrode COME is formed on the second insulating film 12. In the example shown in FIG. 2, the common electrode COME comprises a plurality of segments. The segments of the common electrode COME extend in a first direction X, and are arranged apart from each other in the second direction Y. The common electrode COME is formed of a transparent conductive material such as indium tin oxide (ITO) or indium zinc oxide (IZO). It should be noted that in the example shown in FIG. 2, metal layers ML are formed on the common electrode COME, reducing the resistance of the common electrode COME. However, the metal layers ML may be omitted.

The third insulating film 13 is provided on the common electrode COME, the metal layers ML and the second insulating film 12. The pixel electrodes PE are formed on the third insulating film 13. Each of the pixel electrodes PE is located between associated adjacent source lines S, and opposite to the common electrode COME. Furthermore, each pixel electrode PE includes at least one slit SL located opposite to the common electrode COME. The pixel electrodes PE are formed of a transparent conductive material such as ITO or IZO. The first alignment film AL1 covers the pixel electrodes PE and the third insulating film 13.

On the other hand, the second substrate SUB2 is formed using a second insulating substrate 20 having a light transmissive property, such as a glass substrate or a resin substrate. The second substrate SUB2 comprises a black matrix BM, color filters CFR, CFG, and CFB, an overcoat layer OC, a second alignment film AL2, etc., on a side of the second insulating substrate 20, which is opposed to the first substrate SUB1.

The black matrix BM is formed on an inner surface of the second insulating substrate 20, and defines each of the pixels. The color filters CFR, CFG and CFB are formed on the inner surface of the second insulating substrate 20, and partially stacked on the black matrix BM. The color filter CFR is, for example, a red filter; the color filter CFG is, for example, a green filter; and the color filter CFB is, for example, a blue filter. The overcoat layer OC covers the color filters CFR, CFG and, CFB. Also, the overcoat layer OC is formed of a transparent resin material. The second alignment film AL2 covers the overcoat layer OC.

A detection electrode DETE is formed on an outer surface of the second insulating substrate 20. The detection electrode DETE extends in a direction intersecting the segments of the common electrode COME. In the example shown in FIG. 2, the detection electrode DETE extends in the first direction X. The detection electrode DETE is formed of a transparent conductive material such as ITO or IZO.

The backlight EL is provided on a rear surface side of the display panel PNL. As the backlight BL, various kinds of backlights can be applied, such as a backlight using a light-emitting diode (LED) as a light source and a backlight using a cold-cathode tube (CCFL) as a light source. A detailed explanation of the structure of the backlight BL will be omitted.

The first optical element OD1 is located between the first insulating substrate 10 and the backlight BL. The second optical element OD2 is provided on the detection electrode DETE. Each of the first optical element OD1 and the second optical element OD2 includes at least a polarizer, and may include a retardation film, if necessary.

It should be noted that in a liquid crystal display device, a voltage is applied as described above to generate an electric field in a liquid crystal layer LQ, and change the alignment state of liquid crystal molecules, thereby changing the transmittance at which an image is displayed. However, in the case of adopting a DC drive in which the polarity of a voltage to be applied is not changed, an electric field distribution is changed by impurity ions in the liquid crystal layer, thus lowering display quality. Therefore, in general, an AC drive is adopted in which the polarity of a voltage to be given is inverted at regular intervals.

As an AC drive scheme, a frame-inversion drive scheme, a frame-inversion drive scheme, a column-inversion drive scheme, a line-inversion drive scheme, a dot-inversion drive scheme, etc., are known. Of those drive schemes, the dot-inversion drive scheme is a scheme in which a voltage is applied such that the polarities of any two adjacent pixels are inverted from each other. Thus, in the dot-inversion drive scheme, crosstalk or flicker hardly becomes conspicuous, and a uniform brightness distribution can be obtained; however, the circuit power consumption is large, as compared with the other drive schemes. In contrast, in the column-inversion drive scheme, the circuit power consumption is reduced, since the pixels PX arranged in the row direction have the same polarity. Although a liquid crystal display device adopts any of various drive schemes in accordance with its product specification, the column-inversion drive scheme is optimal in point of reduction of the circuit power consumption. Thus, the display device DSP adopts the column-inversion drive scheme, which is advantageous in reduction of the circuit power consumption.

Figure 3:
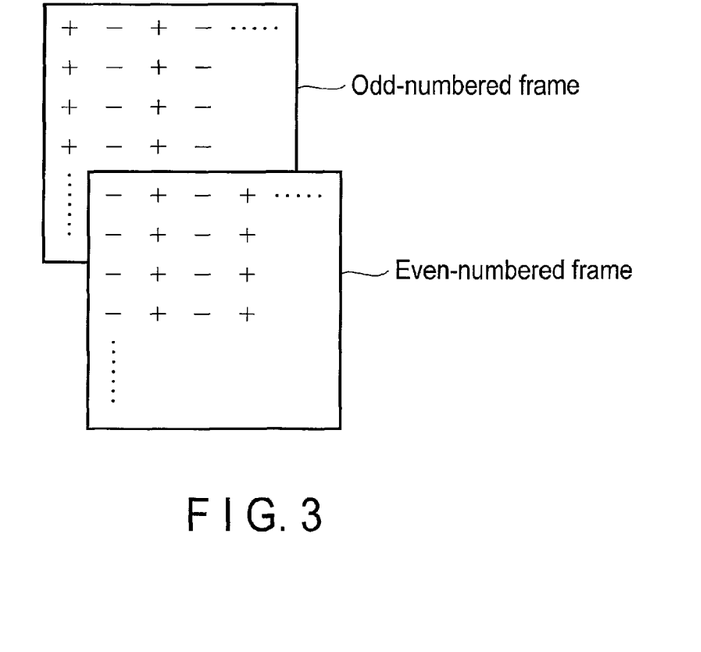
FIG. 3 is a view showing a column-inversion drive scheme of the display device according to the first embodiment.

FIG. 3 is a view showing the column-inversion drive scheme of the display device DSP according to the first embodiment.

In the column-inversion drive scheme, the polarities of signals successively output from each of the source lines S are unchanged in a single frame period, and change from one frame to another.

Figure 4A:
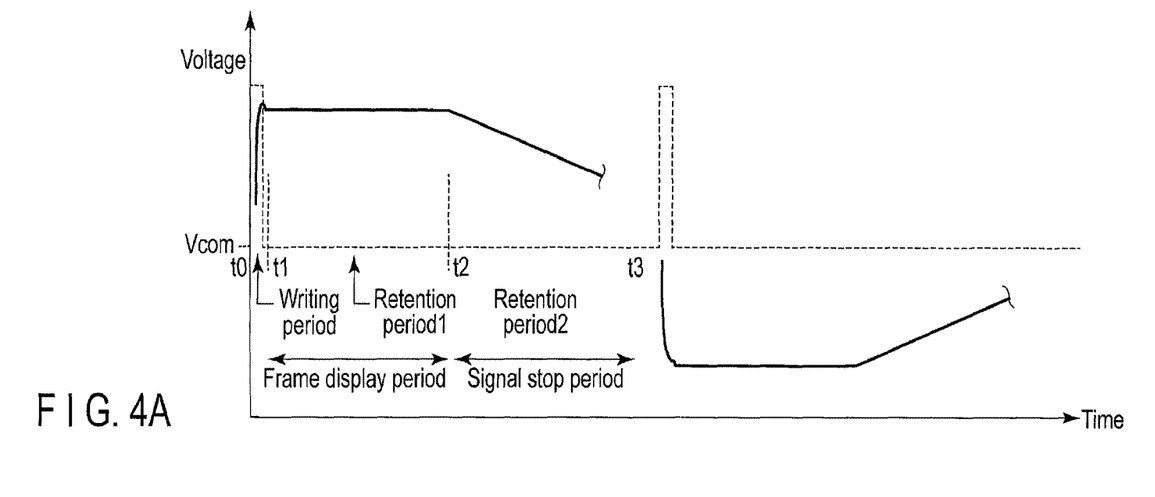
FIG. 4A is a view for explaining a change of a luminance in intermittent driving in the display device according to the first embodiment.
Figure 4B:
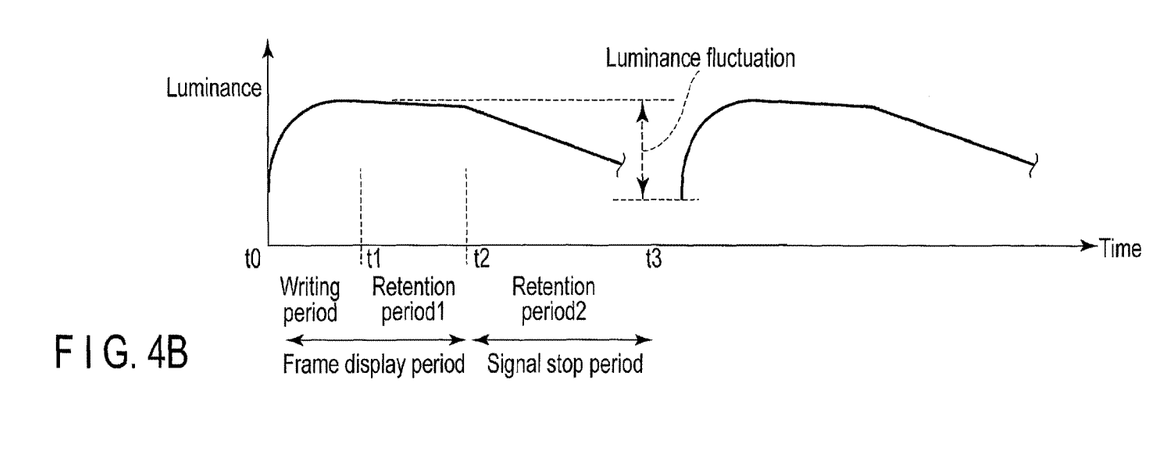
FIG. 4B is another view for explaining the change of the luminance in intermittent driving in the display device according to the first embodiment.

FIGS. 4A and 4B are views for explaining a change of the brightness in intermittent driving in the display device DSP according to the first embodiment.

FIG. 4A shows a change of a voltage to be applied to a liquid crystal LQ of a pixel PX. In this figure, the vertical axis represents voltage and the horizontal axis represents time. Furthermore, in the figure, a dashed line schematically indicates a pulse waveform of a gate signal to be supplied to a gate electrode of a pixel switch SW.

At time t0, at which a write period starts, when the gate signal changes to an on-voltage, the source electrode and drain electrode of the pixel switch SW are electrically connected to each other, a signal (pixel voltage) from a source line S is supplied to a pixel electrode PE. Then, at time t1, at which retention period 1 starts, the gate signal changes to an off-voltage. As a result, in the pixel electrode PE, the signal (pixel voltage) from the source line S is retained. Retention period 1 continues in the entire period of a single frame; that is, it continues until a pixel voltage is written to all pixels PX. In retention period 1, the written pixel voltage is not greatly decreased, and is kept at substantially the same value. In the first embodiment, the write period and retention period 1 can be considered as "frame display period".

From time t2, at which retention period 2 starts, the gate signal is kept off, and a source signal is kept inconstant. That is, in retention period 2, a signal for changing the pixel voltage is not supplied. However, in the intermittent driving, since retention period 2 is longer than retention period 1, an influence of an off-state current leakage of a TFT forming the pixel switch SW and an influence of current leaking from the pixel electrode PE to the common electrode COME through the liquid crystal LQ are actualized, and the pixel voltage decreases with the passage of time. In the first embodiment, retention period 2 can be considered as "signal stop period".

Subsequently, at time t3, at which a write period of a subsequent frame starts, when the gate signal changes to an on-voltage, the source electrode and drain electrode of the pixel switch SW are electrically connected to each other, and a signal (pixel voltage) from the source line S is supplied to the pixel electrode PE. The pixel voltage applied at this time is a signal whose polarity has been inverted. To be more specific, it is a signal whose polarity has been inverted with respect to the common voltage Vcom. Thereafter, the pixel voltage is changed in the same manner as described above.

FIG. 4B is view showing the change of the luminance of a pixel PX. In this figure, the vertical axis represents luminance and the horizontal axis represents time.

From time t0, at which a write period starts, the luminance increases, and at timing t1, at which retention period 1 starts, the luminance reaches a predetermined value. The luminance is then kept at substantially the same value until time t2, at which retention period 2 starts. However, from time t2 which retention period 2 starts, the luminance gradually decreases because of the above off-state current leakage of the TFT, the current leaking from the pixel electrode PE, etc. Then, time t3, at which a write period of a subsequent frame starts, the luminance starts to increase to a predetermined value. Thereafter, the pixel voltage is changed in the same manner as described above.

In such a manner, in the intermittent driving, a luminance change (luminance fluctuation) occurs in a single frame. This luminance fluctuation causes flicker, i.e., screen flicker. It should be noted that the larger the luminance fluctuation, the more conspicuous the flicker. It is therefore possible to reduce the flicker by taking a countermeasure for reducing the luminance fluctuation.

Figure 5A:
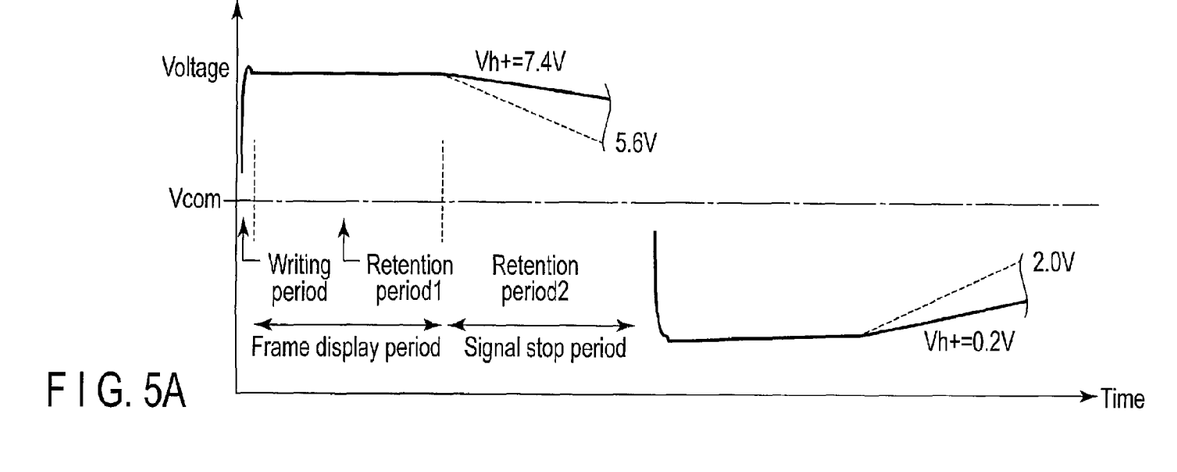
FIG. 5A is a view for explaining a method for reducing the luminance fluctuation in the display device according to the first embodiment.
Figure 5B:
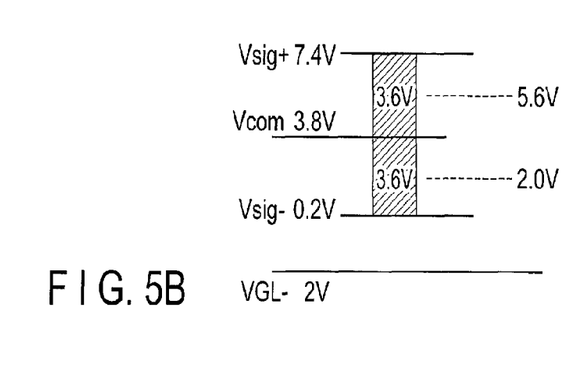
FIG. 5B is a view for explaining the method for reducing the luminance fluctuation in the display device according to the first embodiment.

FIGS. 5A and 5B are views for explaining a method for reducing the luminance fluctuation in the display device DSP according to the first embodiment.

As shown in FIG. 5A, in the case where the display mode of the liquid crystal is a normally-black mode, a voltage corresponding to white gradation is applied to source lines S in the signal stop period (retention period 2). As shown in FIG. 5B, where the common voltage Vcom is 3.8 V, and a gradation voltage range is 3.6 V, the voltages corresponding to white gradation is 7.4 and 0.2 V. In FIG. 5A, for comparison, dot lines are used to show respective transition of luminance fluctuation in the case where voltages of 5.6 and 2.0 V corresponding to a halftone are applied to the source lines S. In such a manner, it is possible to reduce the luminance fluctuation by applying the voltage corresponding to white gradation to the source lines S in the signal stop period (retention period 2).

As described above, the luminance fluctuation can be considered to occur because of an off-state current leakage of the TFT forming the pixel switch SW, current leaking from the pixel electrode PE to the common electrode COME, etc. If so, by applying the voltage corresponding to white gradation to source lines S, it is possible to reduce current leakage from the pixel electrode PE to the source lines S, which occurs because of the off-state current leakage of the TFT. Furthermore, as shown in FIG. 2, since the source lines S are located close to pixel electrodes PE and the common electrode COME, the source lines S, the pixel electrodes PE, the source lines S and the common electrode COME are coupled to each other by parasitic capacitances. Thus, because of application of the voltage corresponding to white gradation to the source lines S, a bias voltage applied to the pixel electrodes PE and the common electrode COME is considered to advantageously act to reduce current leakage.

It should be noted that in the case where the polarity has been inverted as described above, the voltage corresponding to white gradation is a voltage which causes a pixel to have white gradation even when the polarity of the voltage is inverted.

Figure 6A:
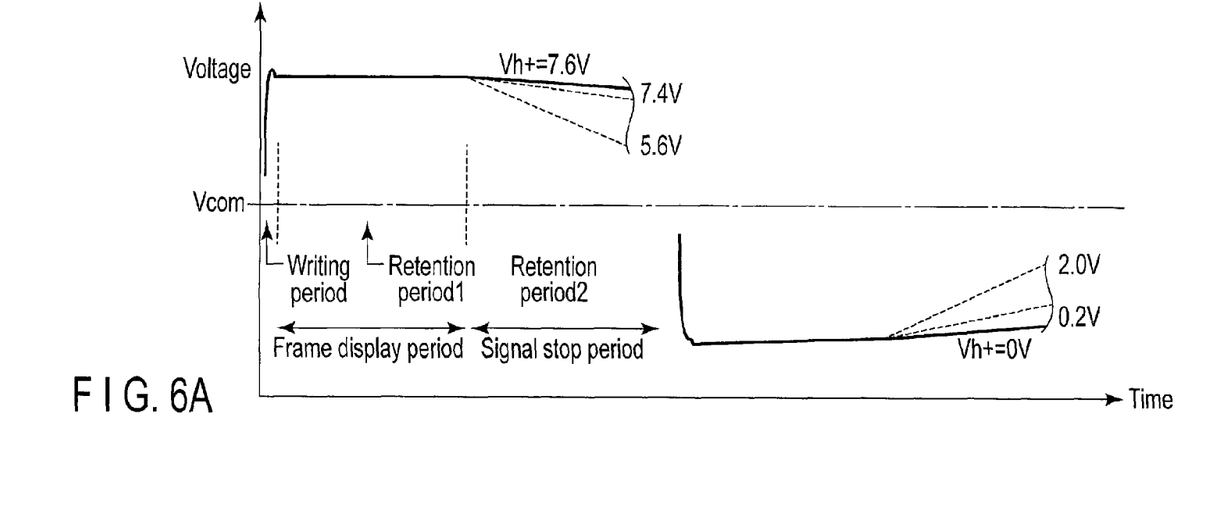
FIG. 6A is a view for explaining another method for reducing the luminance fluctuation in the display device according to the first embodiment.
Figure 6B:
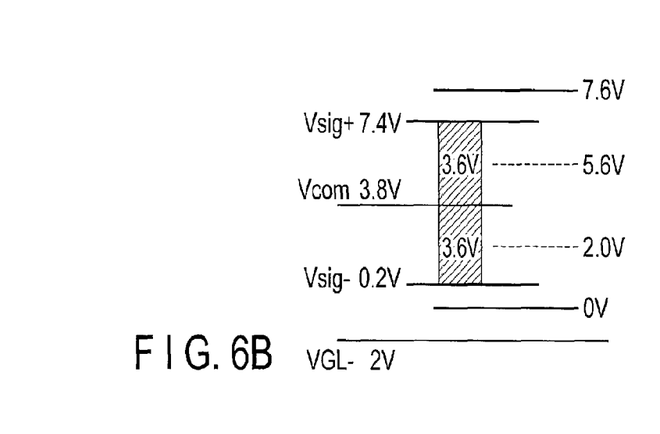
FIG. 6B is another view for explaining the other method for reducing the luminance fluctuation in the display device according to the first embodiment.

FIGS. 6A and 6B are views for explaining another method for reducing the luminance fluctuation in the display device DSP according to the first embodiment.

As shown in FIG. 6A, in the case where the display mode of the liquid crystal is a normally-black mode, a voltage exceeding white gradation is applied to the source lines S in the signal stop period (retention period 2). As shown in FIG. 6B, where the common voltage Vcom is 3.8 V, and the gradation voltage range is 3.6 V, the voltages exceeding white gradation are 7.6 and 0 V. That is, at the time of performing driving with a voltage having positive polarity, the voltage exceeding white gradation is a voltage which is higher than a value obtained by adding the gradation voltage range to the value of the common voltage Vcom; and at the time of performing driving with a voltage having negative polarity, the voltage exceeding white gradation is a voltage which is lower than a value obtained by subtracting the gradation voltage range from the value of the common voltage Vcom. This principle is true of the voltage exceeding black gradation in a normally-white mode.

In FIG. 6A, for comparison, dot lines are used to show respective transition of luminance fluctuation in the case where voltages of 5.6 and 2.0 V corresponding to a halftone and voltages of 7.4 and 0.2 V corresponding to white gradation are applied to the source lines S. In such a manner, it is possible to further reduce the luminance fluctuation by applying the voltage exceeding white gradation to the source lines S in the signal stop period (retention period 2).

Figure 7A:
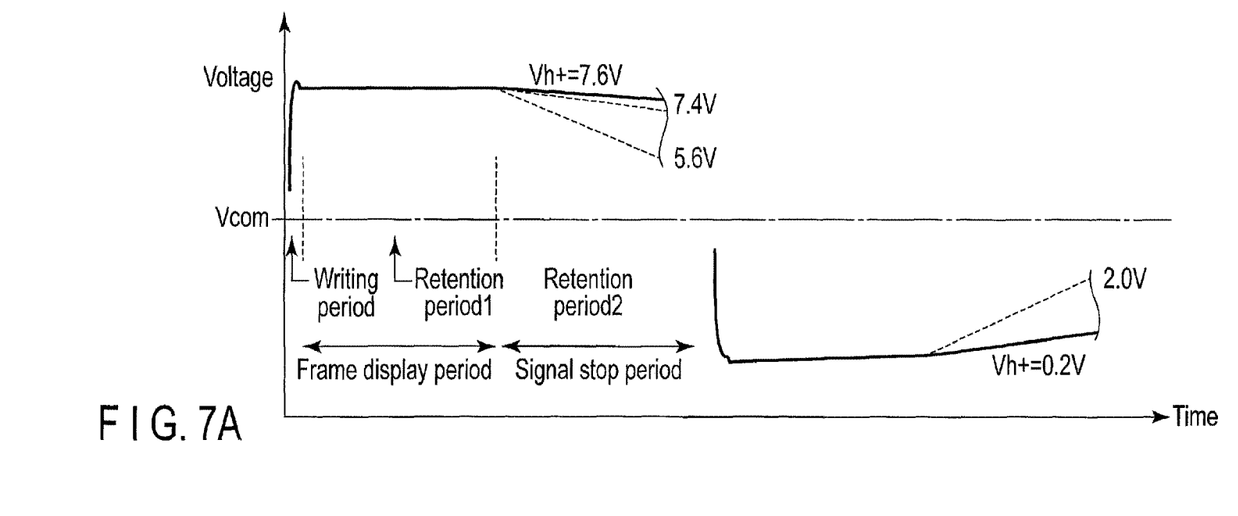
FIG. 7A is a view for explaining a further method for reducing the luminance fluctuation in the display device according to the first embodiment.
Figure 7B:
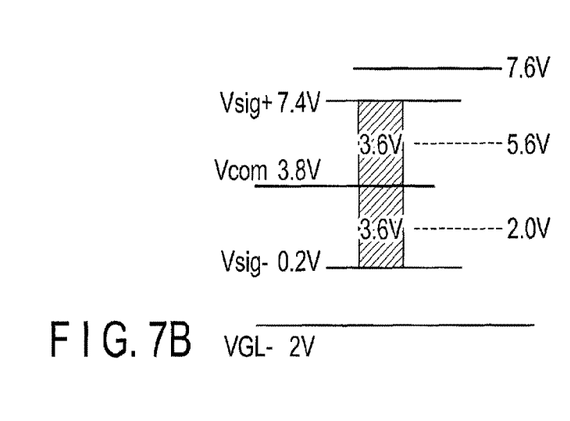
FIG. 7B is another view for explaining the further method for reducing the luminance fluctuation in the display device according to the first embodiment.

FIGS. 7A and 7B are views for explaining a further method for reducing the luminance fluctuation in the display device DSP according to the first embodiment.

As shown in FIG. 7A, in the case where the display mode of the liquid crystal is a normally-black mode, at the time of performing driving with a voltage whose polarity is positive, a voltage exceeding the voltage corresponding to white gradation is applied to the source lines S in the signal stop period (retention period 2). By contrast, at the time of performing driving with a voltage whose polarity is negative, a voltage corresponding to white gradation is applied to the source lines S in the signal stop period (retention period 2). As shown in FIG. 7B, where the common voltage Vcom is 3.8 V and the gradation voltage range is 3.6 V, the voltage exceeding white gradation at the time of performing driving with a voltage whose polarity is positive is 7.6 V, and the voltage corresponding to white gradation at the time of performing driving with a voltage whose polarity is negative is 0.2 V. In FIG. 7A, for comparison, dot lines are used to show respective transition of luminance fluctuation in the case where voltages of 5.6 and 2.0 V corresponding to a halftone and a voltage of 7.4 V corresponding to white gradation are applied to the source lines S.

Next, it will be explained why it is set that when a voltage having positive polarity is applied to the source lines S, the voltage is a voltage corresponding to a higher gradation than a gradation corresponding to a voltage having negative polarity which is to be applied to the source lines S to perform driving.

As described above, the gate drivers GD apply on-voltages to gate lines G successively to apply an on-voltage to a gate electrode of a pixel switch SW electrically connected to a selected gate line G. Then, a signal which is supplied to a source line S through a pixel switch SW in which a source electrode and a drain electrode are electrically connected to each other is supplied to an associated pixel electrode PE. On the other hand, in the pixel switch SW, a parasitic capacitance is present. Thus, when an off-voltage is applied to the gate electrode of the pixel switch SW, and the source electrode and the drain electrode are electrically disconnected from each other, electric charge is extracted from the pixel electrode PE because of the parasitic capacitance, and the pixel voltage is varied. The variation $\Delta Vp$ of the pixel voltage is referred to as a punch-through voltage. The variation $\Delta Vp$ varies in accordance with whether the polarity of the pixel voltage is positive or negative. Therefore, in order to compensate for such a variation between the positive and negative polarities, the voltage to be applied to the source lines S when its polarity is positive is set as a voltage corresponding to a higher gradation than the gradation corresponding to a voltage to be applied to the source lines S when its polarity is negative.

The display device DSP according to the first embodiment as described above can restrict the flicker which occurs in the case of applying the intermittent driving.

Second Embodiment

In the second embodiment, the display device DSP according to the first embodiment is made to further include a touch-sensor function. In this regard, the second embodiment is different from the first embodiment. In the second embodiment, structural elements identical to those in the first embodiment will be denoted by the same reference numbers as in the first embodiment, respectively, and their detailed explanations will be omitted.

As a display device provided with a touch sensor, a so-called on-cell type display device and a so-called in-cell type display device have been proposed. In the on-cell type display device, a touch sensor referred to as a touch panel is mounted on a display surface of the display device. In the in-cell type display device, structural elements originally provided therein are also used as one of a pair of groups of electrodes for a touch sensor, and the other group of electrodes (touch detection electrodes) is provided in such a way as to intersect the above structural elements. The display device DSP according to the second embodiment is an in-cell type display device.

Figure 8:
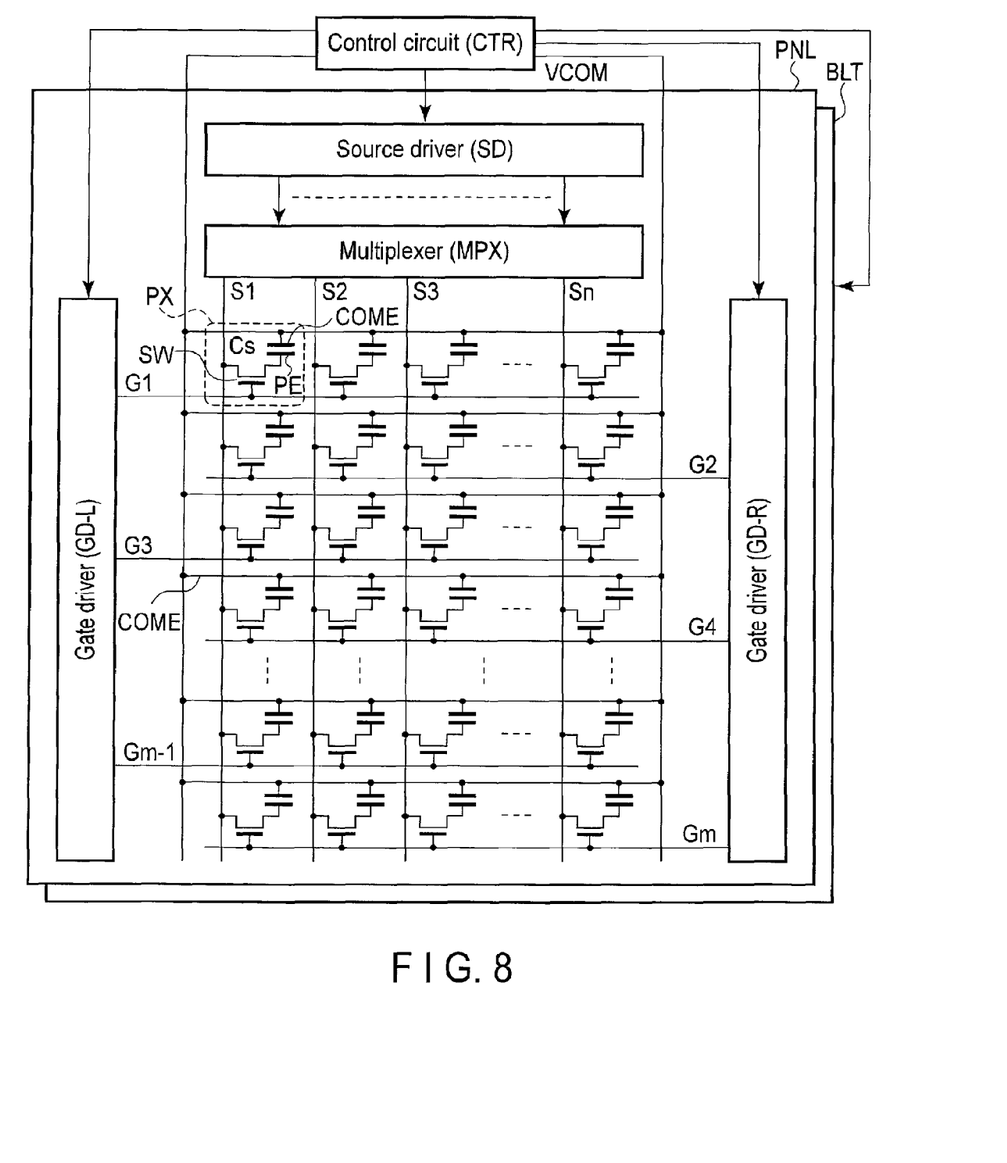
FIG. 8 is a view schematically showing the configuration of a display device according to a second embodiment.

FIG. 8 is a view schematically showing the configuration of the display device DSP according to the second embodiment. It should be noted that in the second embodiment, the display device is a liquid crystal display device.

In the display device DSP according to the second embodiment, a multiplexer MPX is newly provided between a source driver SD and a display portion including display pixels PX arranged in a matrix. The multiplexer MPX supplies an image signal to each of the source lines S in an image display period, and also a touch drive signal Tx (to be described later in detail) to each of the source lines S in a touch detection period. The structural elements other than the multiplexer MPX are the same as those in the first embodiment, and their detailed explanations will be omitted.

Next, a self detection method and a mutual detection method will be explained, which are methods for detecting a touch position in the display device DSP according to the second embodiment.

<Self-Detection Method>

FIGS. 9A, 9B, 10A and 10B are views for explaining a principle of the self-detection method in the display device DSP according to the second embodiment.

Figure 9A:
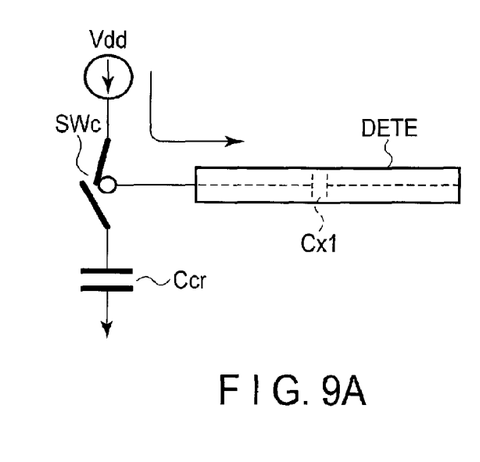
FIG. 9A is a view for explaining a principle of a self-detection method in the display device according to the second embodiment.
Figure 9B:
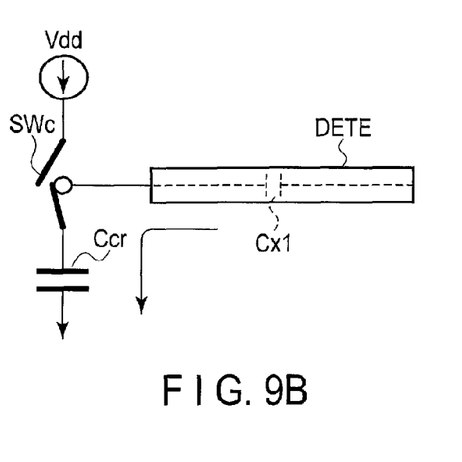
FIG. 9B is another view for explaining the principle of the self-detection method in the display device according Lo the second embodiment.

FIGS. 9A and 9B show states in which a touch panel is not touched by a user's finger. To be more specific, FIG. 9A shows a state that a power supply Vdd and a detection electrode DETE are connected to each other by a control switch SWc, and the detection electrode DETE is not connected to a capacitor Ccr. In this state, the detection electrode DETE, which has capacitance Cx1, is charged. FIG. 9B shows a state in which by the control switch SWc, the power supply Vdd and the detection electrode DETE are disconnected from each other, and the detection electrode DETE and the capacitor Ccr are connected to each other. In this state, the detection electrode DETE having capacitance Cx1 is discharged through the capacitor Ccr.

Figure 10A:
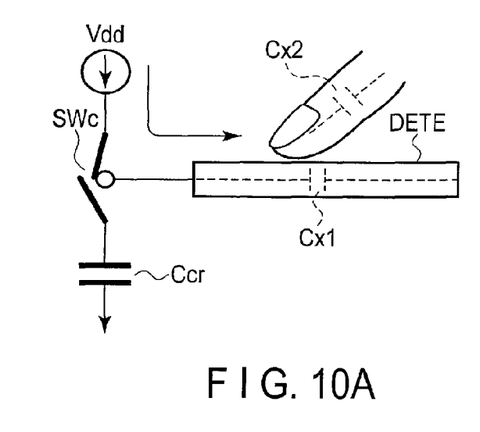
FIG. 10A is another view for explaining the principle of the self-detection method in the display device according to the second embodiment.
Figure 10B:
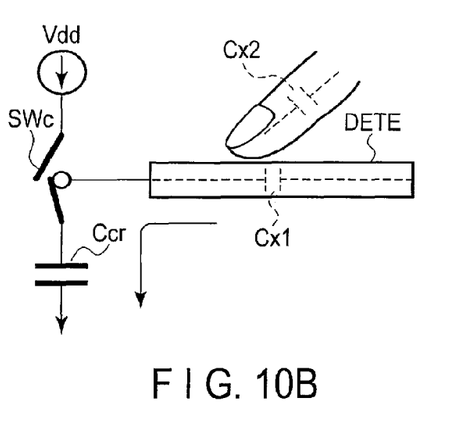
FIG. 10B is a further view for explaining the principle of the self-detection method in the display device according to the second embodiment.

FIGS. 10A and 10B show states in which the touch panel is touched by the user's finger. To be more specific, FIG. 10A shows a state in which by the control switch SWc, the power supply Vdd and the detection electrode DETE are connected to each other, and the detection electrode DETE is not connected to the capacitor Ccr. In this state, not only the detection electrode DETE having capacitance Cx1, but the user's finger, which is located close to the detection electrode DETE to thus have capacitance Cx2, is charged. FIG. 10B shows a state in which by the control switch SWc, the power supply Vdd and the detection electrode DETE are disconnected from each other, and the detection electrode DETE and the capacitor Ccr are connected to each other. In this state, the detection electrode DETE having capacitance Cx1 and the finger having capacitance Cx2 are both discharged through the capacitor Ccr.

It should be noted that a voltage variation characteristic of the capacitor Ccr at the time of discharge as shown in FIG. 9B (in the case where the finger does not touch the panel) is clearly different from that of the capacitor Ccr at the time of discharge as shown in FIG. 10B (in the case where the finger touches the panel), because of the presence of capacitance Cx2. Therefore, in the self-detection method, it is determined whether an input operation by the finger or the like is performed or not, by referring to the voltage variation characteristic of the capacitor Ccr, which varies in accordance with whether capacitance Cx2 is present or absent.

<Mutual Detection Method>

Figure 11:
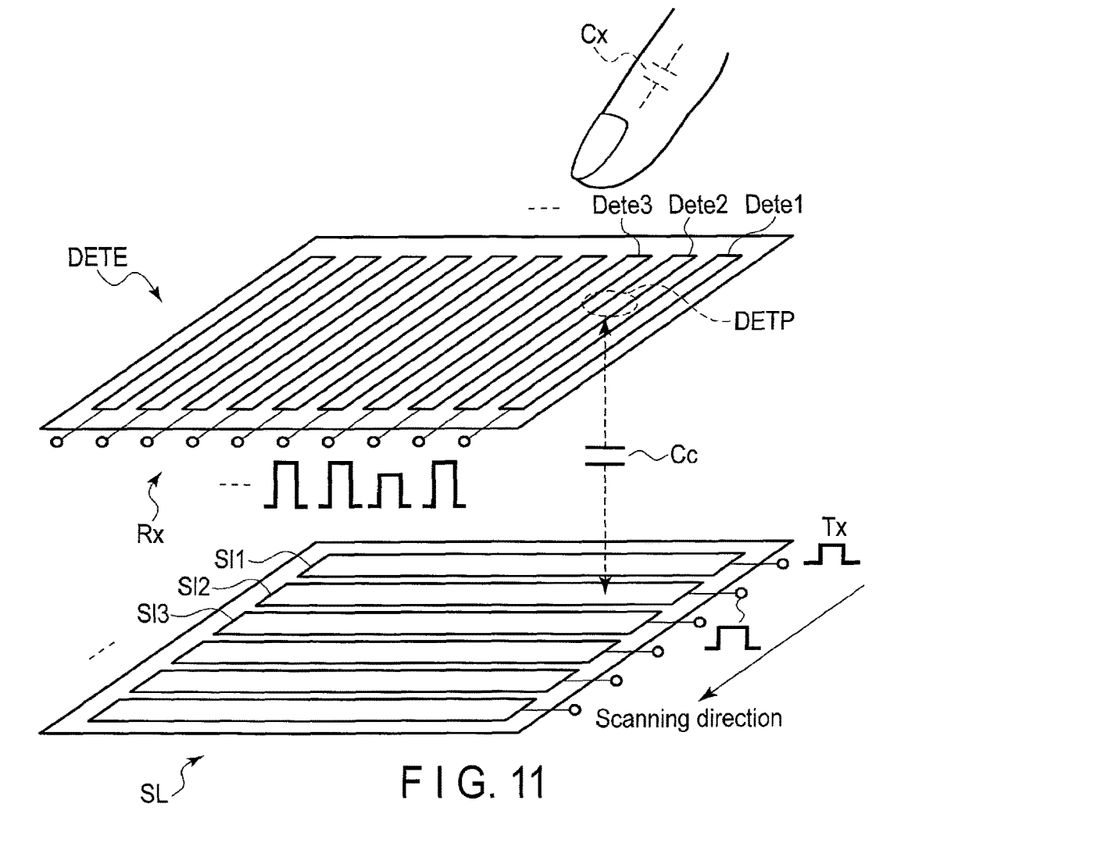
FIG. 11 is a view showing a representative basic structure of a mutual-detection type of display device according to the second embodiment.

FIG. 11 is a view showing a representative basic structure of a mutual detection type of display device according to the second embodiment. A detection electrode DETE and a drive electrode SL are used. The drive electrode SL is a generic name for source lines S, and includes plural stripe drive electrodes S11, S12, S13, ... arranged as stripes. These stripe drive electrodes S11, S12, S13, ... are arranged in a scanning (driving) direction. It should be noted that the stripe drive electrodes S1 arranged as stripes may be bundled in units of an appropriate number of source lines S.

The detection electrode DETE includes plural stripe detection electrodes Dete1, Dete2, Dete3, ... arranged as stripes. These stripe detection electrodes Dete1, Dete2, Dete3, . . . are arranged in a direction perpendicular to the stripe drive electrodes S11, S12, S13, . . . .

The drive electrode SL and the detection electrode DETE are separated from each other in a vertical direction. Thus, basically, capacitances Cc are present between the stripe drive electrodes S11, S12, S13, . . . arranged as stripes and the stripe detection electrodes Dete1, Dete2, Dete3, . . . arranged as stripes.

The stripe drive electrodes S11, S12, S13, . . . are scanned at the drive pulse Tx at regular intervals. It is assumed that the user's finger is now close to the detection electrode Dete2 of the detection electrodes arranged as stripes. At this time, when the drive electrode S12 is supplied with a drive pulse, from the drive electrode S12, a pulse can be obtained whose level is lower than those obtained from the other detection electrodes. The capacitance Cx which the finger has varies in accordance with whether the finger is close to or far from the detection electrode DETE. Thus, the level of a detection pulse also varies in accordance with whether the finger is close to or far from the detection electrode DETE. Therefore, the proximity of the finger to the surface of the touch panel can be determined from the level of the detection pulse. Needless to say, the two-dimensional position of the finger on the surface of the touch panel can be detected from an electrode drive timing of the drive pulse Tx and an output timing of a detection pulse Rx.

Figure 12:
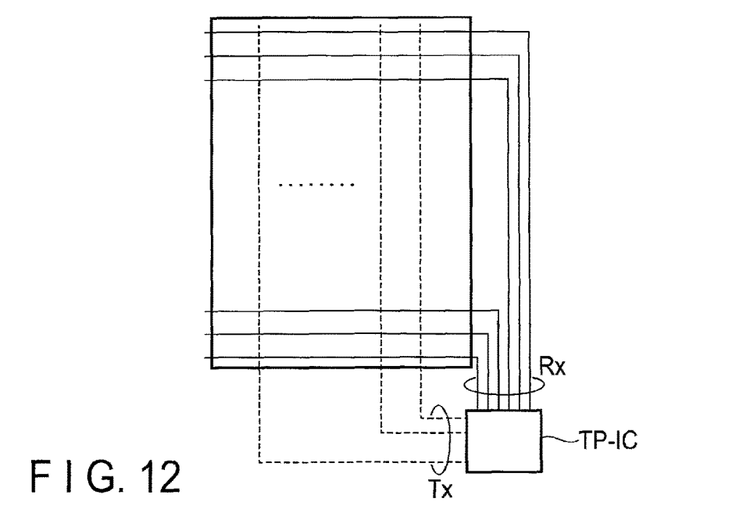
FIG. 12 is a plan view showing the structure of a sensor of a display device according to the second embodiment.

FIG. 12 is a plan view showing the structure of a sensor of the display device DSP according to the second embodiment. The detection electrode DETE and the drive electrode SL are provided to intersect each other. Lines from those electrodes are connected to an IC (TP-IC) for touch processing. As described above, in the display device DSP according to the second embodiment, the detection method can be switched between the self-detection method and the mutual detection method. In the self-detection method, the IC (TP-IC) for touch processing drives the drive electrode SL and the detection electrode DETE to detect the position of an object which is in contact (or proximity) to the touch panel in the second direction and that in the first direction, respectively. In the mutual detection method, the IC (TP-IC) for touch processing causes a drive pulse Tx to be input to the drive electrode SL, and a detection pulse Rx is obtained from the detection electrode DETE.

Figure 13:
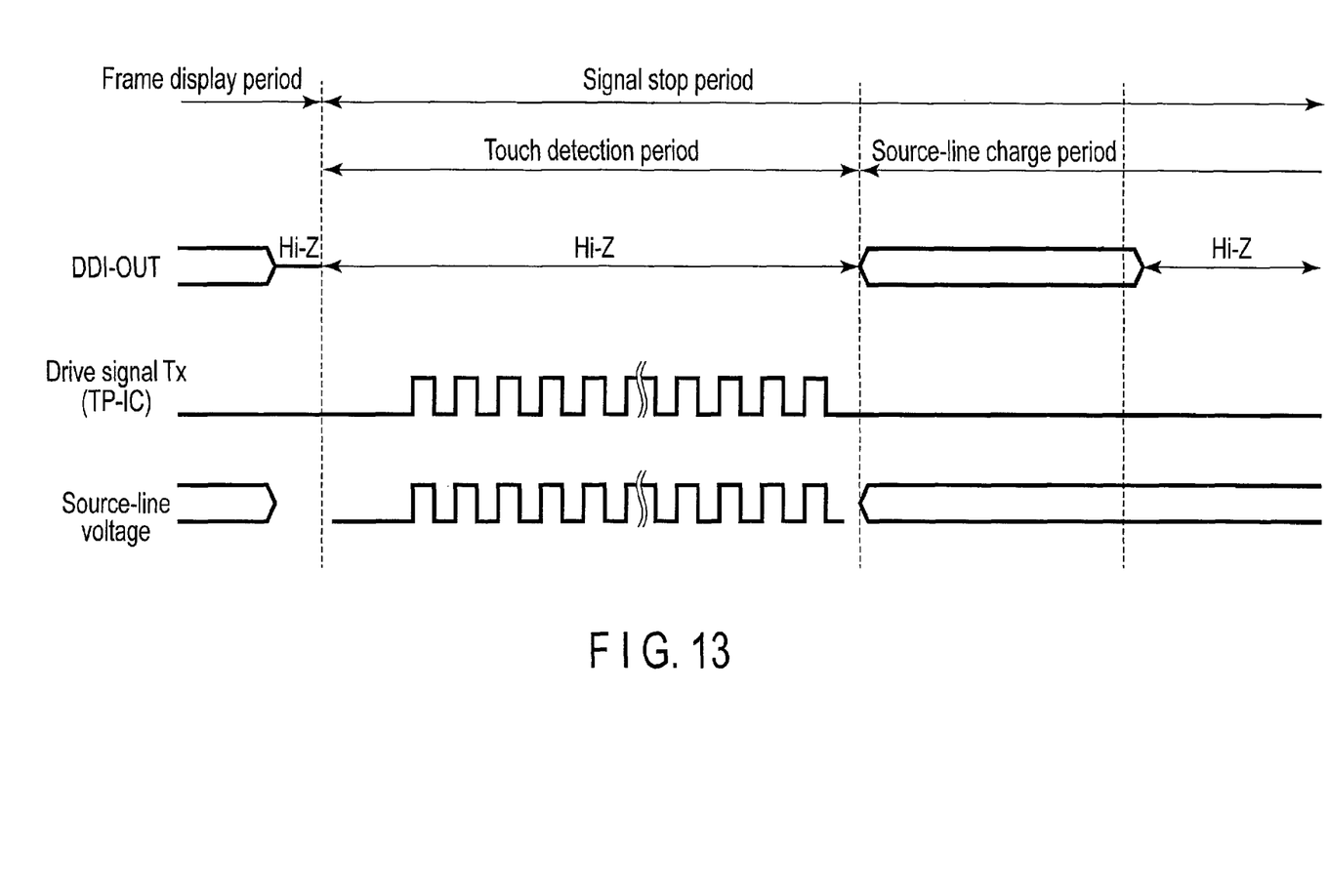
FIG. 13 is a view for explaining a driving method for an image display operation and a touch detection operation of the display device according to the second embodiment.

FIG. 13 is a view for explaining a driving method for an image display operation and a touch detection operation of the display device DSP according to the second embodiment.

In a frame display period, a display signal (DDI-OUT) for performing the display operation is output from the control circuit CTR. The display signal (DDI-OUT) is supplied to the source lines S through the source driver SD and the multiplexer MPX, thereby causing the display operation to be performed.

In the signal stop period, first, in the touch detection period, the touch detection operation is performed, and then, in a source-line charge period, a predetermined voltage is applied to the source lines S.

In the touch detection period, the display signal (DDI-OUT) is stopped to cause the impendence to be high (Hi-Z). The multiplexer MPX executes a switching operation to causing a drive signal Tx output from the IC (TP-IC) to be supplied to the source lines S (drive electrode SL). The IC (TP-IC) for touch processing performs the touch detection operation according to the mutual detection method or that according to the self-detection method. In this case, it is assumed that an average voltage of a drive signal Tx is a voltage corresponding to white gradation.

In the source-line charge period, the multiplexer MPX performs the switching operation to cause the display signal (DDI-OUT) to be output to the source lines S. At an initial stage of the source-line charge period, the control circuit CTR applies a voltage to compensate for reduction of the potentials of the source lines S in the touch detection period. Thereafter, as described in the above explanation of the first embodiment with reference to FIGS. 5 to 7, in the intermittent driving, a predetermined voltage is applied to the source lines S through the multiplexer MPX.

It should be noted that although it is explained with reference to FIG. 13 that after the touch detection period, the source-line charge period continues until a subsequent frame display period starts, it may be set that the touch detection period and the source-line charge period may alternately continue until the subsequent frame display period starts.

Furthermore, in the touch detection period, although the touch detection operation according to either the mutual detection method or the self-detection method is performed, it may be set that the touch detection operation according to the self-detection method is performed, and based on the result of the operation, the detection method is switched such that the mutual detection method is partially performed.

Figure 14A:
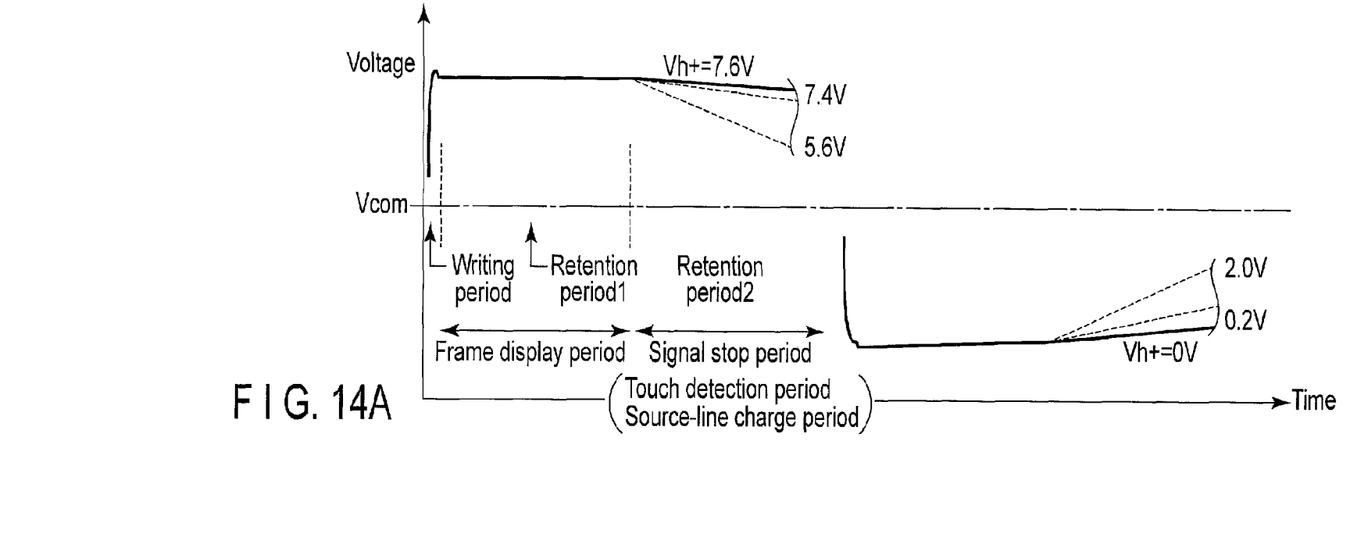
FIG. 14A is a view for explaining a method for reducing the luminance fluctuation in the display device according to the second embodiment.
Figure 14B:
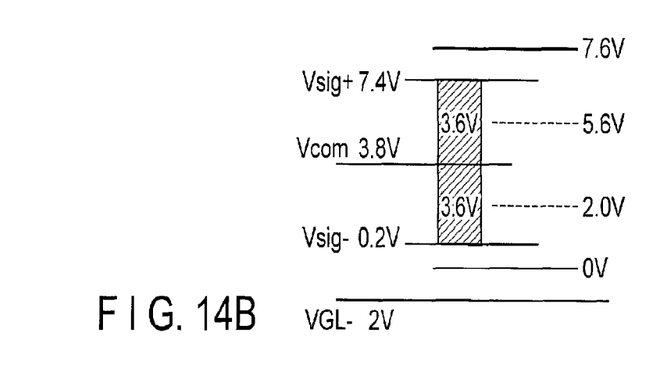
FIG. 14B is a view for explaining the method for reducing the luminance fluctuation in the display device according to the second embodiment.

FIGS. 14A and 14B are views for explaining a method for reducing the luminance fluctuation in the display device DSP according to the second embodiment.

As shown in FIG. 14A, in the touch detection period in the signal stop period, a drive signal Tx is set such that the average voltage value of the drive signal Tx exceeds white gradation; and in the source-line charge period in the signal stop period, a voltage exceeding white gradation is applied to the source lines S. As shown in FIG. 14B, where the common voltage Vcom is 3.8 V, the voltages exceeding white gradation are 7.6 and 0V. In FIG. 14A, for comparison, dot lines are used to show respective transition of luminance fluctuation in the case where voltages of 5.6 and 2.0 V corresponding to a halftone and voltages of 7.4 and 0.2 V corresponding to white gradation are applied to the source lines S.

It should be noted that in the second embodiment, a predetermined voltage is applied to the source lines S in the manner explained referring to FIGS. 5A to 7B with respect to the first embodiment.

According to the second embodiment explained above, it is also possible to reduce the luminance fluctuation in the display device provided with a sensor having an in-cell type of touch detection function.

It should be noted that the above explanation of each of the above embodiments is given with respect to the case where the display mode of the liquid crystal is a normally-black mode. However, in the case where the display mode of the liquid crystal is a normally-white mode, a voltage corresponding to gradation less than or equal to black gradation is applied to the source lines S in the signal stop period (retention period 2) to reduce the luminance fluctuation.

Also, although the above explanation of each of the above embodiments refers to the case where the liquid crystal is a lateral-electric-field type of liquid crystal, it is obvious that each embodiment can also be applied to a vertical-electric-field type of liquid crystal.

All display devices which can be put to practical use by a person with ordinary skill by changing as appropriate the design of the display device described above with respect to each of the above embodiments fall within the scope of the present invention, as long as they have the subject matter of the invention.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in each of the above embodiments, or adds/deletes/alters a step or a condition to/from/in each of the embodiments, as long as they have the subject matter of the invention, they fall within the scope of the invention.

Furthermore, other than the above advantages of the embodiments, advantages which are obviously considered obtainable by the embodiments based on the description of the present application, or advantages arbitrarily conceivable by a person with ordinary skill in the art from the description of the present application are naturally considered also obtainable by the embodiment.

Various inventions can be achieved by combining as appropriate a plurality of structural elements disclosed with respect to the embodiments. For example, some structural elements may be deleted from all the structural elements disclosed with respect to the above embodiments. Furthermore, structural elements of one embodiment may be combined with structural elements of another embodiment as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   plural display pixels arranged in a matrix;
   plural gate lines extending along rows in which the display pixels are arranged;
   plural source lines extending along columns in which the display pixels are arranged; and
   a control circuit which controls by applying intermittent driving and a column-inversion drive scheme, an operation in which drive signals are supplied to the gate lines and the source lines, and an image signal is supplied to the display pixels and held thereby,
   wherein the display pixels each include a liquid crystal in which alignment of liquid crystal molecules is changed by a voltage between pixel electrodes and a common electrode, and
   the control circuit applies in a signal stop period in the intermittent driving, a voltage corresponding to a gradation higher than or equal to white gradation to the source lines in a case where a display mode of the liquid crystal is a normally-black mode.

2. The display device according to claim 1, wherein the control circuit applies in the signal stop period in the intermittent driving, a voltage corresponding to white gradation to the source lines in the case where the display mode of the liquid crystal is the normally-black mode.

3. The display device according to claim 1, wherein the control circuit applies in the signal stop period in the intermittent driving, a voltage exceeding white gradation to the source lines in the case where the display mode of the liquid crystal is the normally-black mode.

4. The display device according to claim 1, wherein in the signal stop period in the intermittent driving, in the case where the display mode of the liquid crystal is the normally-black mode, a voltage which is applied to the source lines when polarity of the voltage is positive in the column-inversion drive scheme is a voltage corresponding to a higher gradation than a gradation corresponding to a voltage which is applied to the source lines when polarity of the voltage is negative in the column-inversion drive scheme.

5. A display device provided with a sensor, comprising:
   a pair of groups of electrodes for a touch sensor, one of the groups of electrodes extending in a single direction, the other group of electrodes being arranged to intersect the one group of electrodes;
   plural display pixels arranged in a matrix;
   plural gate lines extending along rows in which the plural display pixels are arranged;
   plural source lines extending along columns in which the plural display pixels are arranged; and
   a control circuit which controls by applying intermittent driving and a column-inversion drive scheme, an operation in which drive signals are supplied to the gate lines and the source lines, and an image signal is supplied to the display pixels and held thereby,
   wherein:
   the display pixels each include a liquid crystal in which alignment of liquid crystal molecules is changed by a voltage between a pixel electrode and a common electrode;
   the control circuit applies in a signal stop period in the intermittent driving, a voltage corresponding to a gradation higher than or equal to white gradation to the source lines in a case where a display mode of the liquid crystal is a normally-black mode; and
   the source lines are also used as the one of groups of electrodes for the touch sensor.

6. The display device provided with the sensor, according to claim 5, wherein the signal stop period in the intermittent driving includes a touch detection period in which the pair of groups of electrodes for the touch sensor are driven to perform a touch detection operation and a source-line charge period in which the voltage is applied to the source lines.

7. The display device provided with the sensor, according to claim 6, wherein in the case where the display mode of the liquid crystal is the normally-black mode, in the touch detection period, a string of drive pulses an average voltage of which corresponds to white gradation is supplied to the source lines.

8. The display device provided with the sensor, according to claim 6, wherein in the signal stop period in the intermittent driving, the touch detection period and the source-line charge period are alternately repeatedly applied.

9. The display device provided with the sensor, according to claim 6, wherein a touch detection method is switchable between a self-detection method and a mutual detection method.

* * * * *